(12) United States Patent
Shigetoyo et al.

(10) Patent No.: US 8,985,064 B2
(45) Date of Patent: Mar. 24, 2015

(54) FUEL SUPPLY DEVICE

(71) Applicant: Honda Motor Co., Ltd, Tokyo (JP)

(72) Inventors: Kenji Shigetoyo, Saitama (JP);
Hirotsugu Kudo, Saitama (JP); Hiroshi Chishima, Saitama (JP); Masahiko Asanuma, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 29 days.

(21) Appl. No.: 13/911,719

(22) Filed: Jun. 6, 2013

(65) Prior Publication Data

US 2013/0333644 A1 Dec. 19, 2013

(30) Foreign Application Priority Data

Jun. 18, 2012 (JP) ................................. 2012-137277
Nov. 9, 2012 (JP) ................................. 2012-247620

(51) Int. Cl.
*F02B 43/00* (2006.01)
*F02M 53/04* (2006.01)
*F02D 19/06* (2006.01)

(52) U.S. Cl.
CPC ........... *F02M 53/04* (2013.01); *F02D 19/0649* (2013.01)
USPC ............................................. 123/1 A; 123/2

(58) Field of Classification Search
USPC .................................................. 123/1 A, 2, 3
See application file for complete search history.

(56) References Cited

FOREIGN PATENT DOCUMENTS

| JP | 2004-522039 A | 7/2004 |
|---|---|---|
| JP | 2004-232624 A | 8/2004 |
| JP | 2005-146877 A | 6/2005 |
| JP | 2007-231818 A | 9/2007 |
| JP | 2010-001754 A | 1/2010 |
| JP | 2010-144735 A | 7/2010 |
| JP | 2010-236454 A | 10/2010 |

OTHER PUBLICATIONS

Japanese Office Action dated Feb. 18, 2014, issued in corresponding Japanese Patent Application No. 2012-247620 (2 pages).

*Primary Examiner* — Noah Kamen
(74) *Attorney, Agent, or Firm* — Westerman, Hattori, Daniels & Adrian, LLP

(57) ABSTRACT

A device capable of supplying an internal combustion engine 60 with a first fuel F1 of a high octane number fuel, and a second fuel F2 of a low octane number fuel or a raw fuel F0. The device is equipped with a cooling medium circulating path LL configured to perform heat exchange between a cooling medium for cooling the internal combustion engine 60 and a separator 20. The device adjusts a flow rate of the cooling medium in the cooling medium circulating path LL, so that a separator temperature T1 is contained in a predetermined temperature range, according to T1, a raw fuel temperature T2 and a cooling medium temperature T3.

4 Claims, 8 Drawing Sheets

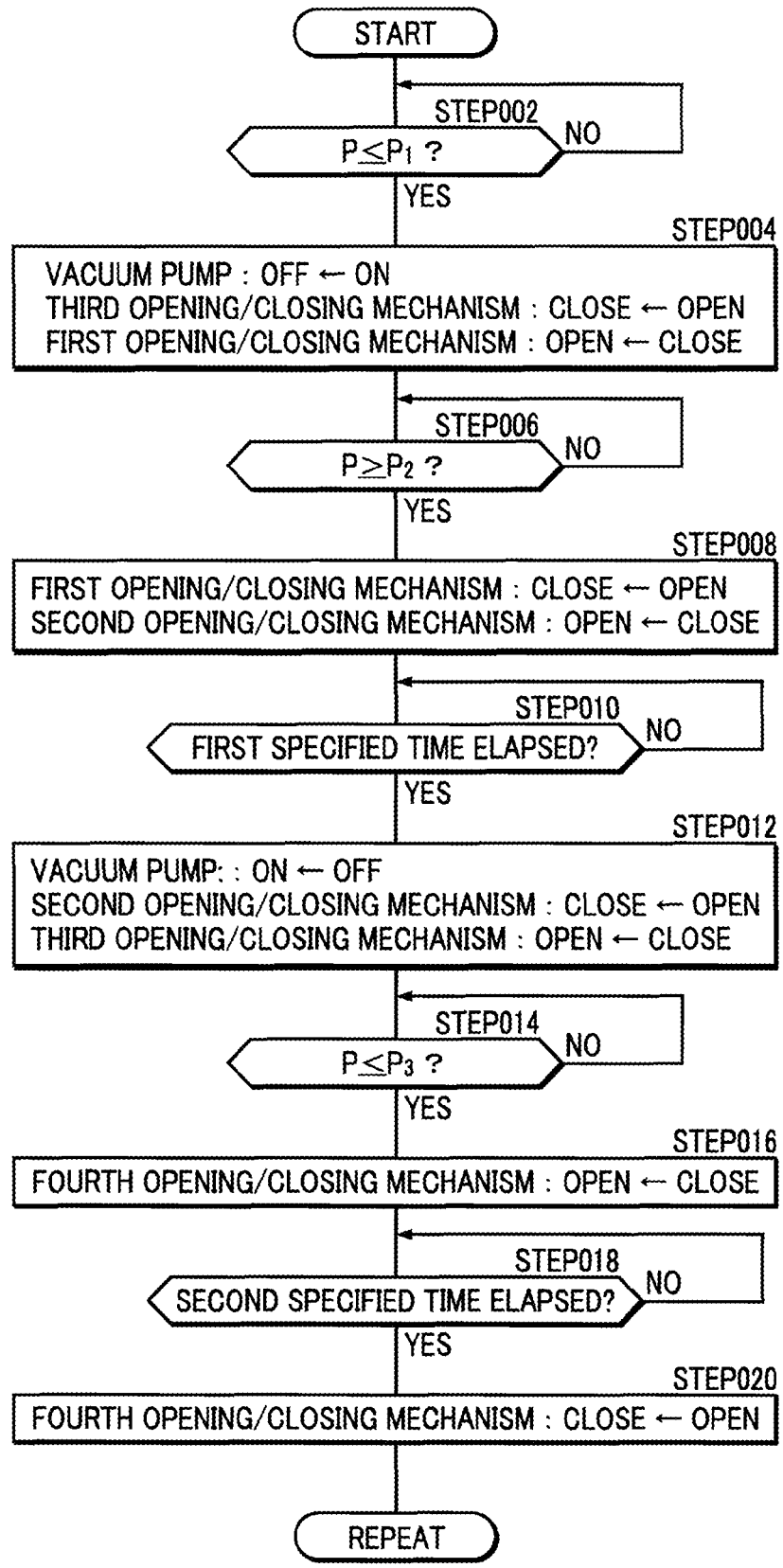

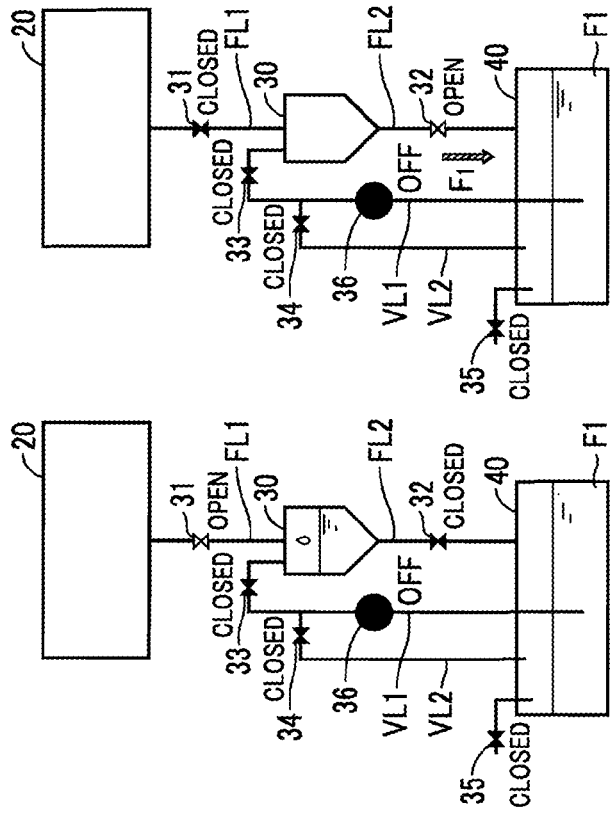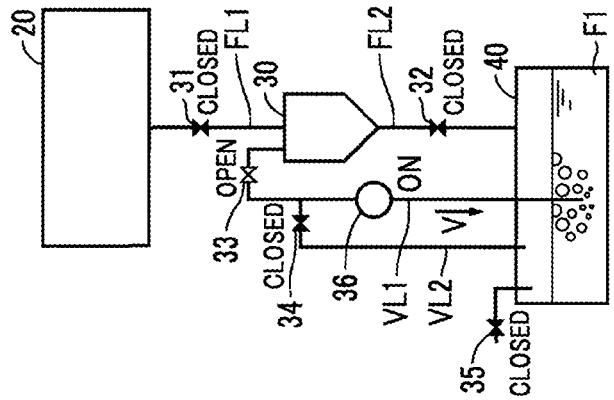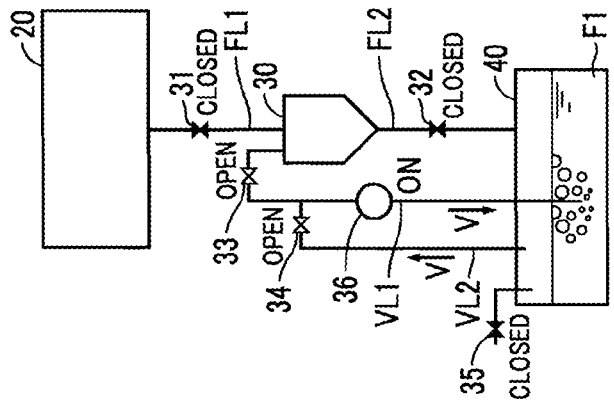

FIG.7

| SEPARATOR INLET TEMPERATURE (T1) | TRANSMISSION RATE [kg/m²/hr] |
|---|---|
| 70°C | 0.9 |
| 80°C | 1.4 | ated Art

FUEL SUPPLY DEVICE

BACKGROUND OF THE INVENTION

1. Field of the Invention

The present invention relates to a technique for supplying fuel to an internal combustion engine.

2. Description of the Related Art

There has been known a fuel supply device which separates a raw fuel and generate a fuel having characteristics different from the raw fuel, and which supplies these fuels. As such fuel supply device, for example, there is a device equipped with a separator which separates a raw fuel into a high octane number fuel having higher octane number than the raw fuel and a low octane number fuel having lower octane number than the raw fuel (refer to Japanese Patent Application Laid-Open No. 2007-231818, and Japanese Patent Application Laid-Open No. 2004-522039).

Performance of separating the fuel (transmission rate) depends on a temperature of the separator, so that adjustment of the temperature of the separator becomes one of important problems of the fuel supply device. On this point, there is proposed a device which adjusts the temperature of the separator, by heating the fuel as a separation target beforehand (refer to Japanese Patent Application Laid-Open No. 2004-232624). Further, there is proposed a device which performs temperature raising of the separator rapidly, by injecting the high octane number fuel having high evaporation temperature into the separator, so as to adjust the temperature rapidly at the starting of the engine (refer to Japanese Patent Application Laid-Open No. 2010-144735). Further, there is proposed a device which raises the temperature of the separator favorably, by increasing a pressure of a raw fuel supplied to the separator, in the case where the temperature of the separator is low (refer to Japanese Patent Application Laid-Open No. 2010-1754).

However, there is a problem that, even when the fuel or the separator is heated beforehand, the temperature of the separator drops from an evaporative latent heat or a radiation of the fuel generated during separation, and that a raw fuel separation performance of the separator cannot be maintained to a desired manner.

SUMMARY OF THE INVENTION

Therefore, it is an object of the present invention to provide a fuel supply device capable of maintaining a raw fuel separation performance of a separator at a desired manner.

A first aspect of the present invention is a fuel supply device which supplies an internal combustion engine with a first fuel which contains a larger number of high octane number components than a raw fuel and a second fuel which contains a larger number of low octane number components than the raw fuel or the raw fuel selectively or with a specified mixing ratio simultaneously, where the first fuel and the second fuel are separated from the raw fuel, the device including: a raw fuel tank storing the raw fuel; a separator which separates the raw fuel into the first fuel and the second fuel; a raw fuel path configured to discharge the raw fuel from the raw fuel tank to the separator by a raw fuel discharge device; and a cooling medium circulating path configured to circulate a cooling medium for cooling the internal combustion engine, wherein the cooling medium circulating path is configured to perform heat exchange between the cooling medium circulating in the cooling medium circulating path and the separator, and the fuel supply device further includes a flow rate adjusting mechanism which adjusts a flow rate of the cooling medium in the cooling medium circulating path, taking at least one of a first temperature which is a temperature of the separator, a second temperature which is a temperature of the raw fuel in the raw fuel path, and a third temperature which is a temperature of the cooling medium downstream of the internal combustion engine and upstream of the separator flowing in the cooling medium circulating path, as a reference factor, so that the first temperature is contained in a predetermined temperature range.

According to the first aspect of the invention, the cooling medium circulating path in which the cooling medium for cooling the internal combustion engine circulates is configured to perform heat exchange between the circulating cooling medium and the separator. The cooling medium heated by the internal combustion engine circulates in the cooling medium circulating path, and exchanges heat with the separator. By doing so, the separator is heated, and the heat amount lost by the evaporative latent heat and radiation during the fuel separation is compensated.

Further, the flow rate of the cooling medium is adjusted, taking at least one of "the first temperature" which is the temperature of the separator, "the second temperature" which is the temperature of the raw fuel at the raw fuel path, and "the third temperature" which is the temperature of the cooling medium flowing in the cooling medium circulating path downstream of the internal combustion engine and upstream of the separator, as the reference factor. "The second temperature" is the temperature of the raw fuel flowing into the separator, so that it exerts influence on "the first temperature" which is the temperature of the separator. Further, "the third temperature" is the temperature of the cooling medium flowing downstream of the internal combustion engine and upstream of the separator in the cooling medium circulating path, and since the separator is heated by the cooling medium, it exerts influence on "the first temperature" which is the temperature of the separator. That is, the flow rate of the cooling medium is adjusted using the factor exerting influence on "the first temperature". Therefore, "the first temperature" may be controlled to an appropriate temperature range from the viewpoint of maintaining the separation performance of the separator to a desired manner, and the raw fuel separation performance of the separator may be maintained to the desired manner.

In the case where an upper limit of a predetermined range of "the first temperature" is set, the separation performance may be restricted, so that the first fuel separated is decreased, and a space for processing and storing the first fuel after separation may be cut down. This especially has an effect in the case where a mounting space for a vehicle is limited, for example when mounting the device to small vehicles.

A second aspect of the invention is characterized in that, in the first aspect of the invention, the fuel supply device further includes a heat exchanger configured to perform heat exchange between the cooling medium flowing in the cooling medium circulating path downstream of the internal combustion engine and upstream of the separator and the raw fuel flowing in the raw fuel path.

According to the second aspect of the invention, it becomes possible to raise the temperature of the raw fuel, and lower the temperature of the cooling medium, by performing heat exchange between the cooling medium and the raw fuel upstream of the separator. When the raw fuel is supplied, the temperature of the separator may be prevented from dropping to a level below a lower limit value of the appropriate temperature range from the viewpoint of maintaining the separation performance to the desired manner, to the extent the temperature of the raw fuel is raised. On the other hand, by lowering the temperature of the cooling medium, it becomes possible to prevent heating of the separator to a level exceeding an upper limit value of the appropriate temperature range from the viewpoint of maintaining the separation performance to the desired manner, from an excessively high-temperature cooling medium. Therefore, it becomes possible to control the temperature of the separator within the appropriate temperature range from the viewpoint of maintaining the separation performance to the desired manner, and maintain the raw fuel separation performance of the separator to the desired manner.

A third aspect of the invention is characterized in that, in the first aspect of the present invention, the fuel supply device further includes a second fuel path configured to feed the second fuel separated by the separator into the raw fuel tank, and a cooler configured to cool the second fuel, in the second fuel path.

According to the third aspect of the invention, in the case where it is configured to feed the separated second fuel into the raw fuel tank, the second fuel may be cooled by the cooler. The second fuel is cooled before sent into the raw fuel tank, so that it becomes possible to prevent the temperature of the raw fuel stored in the raw fuel tank from becoming excessively high. As a result, it becomes possible to prevent the separator from being heated excessively to a level deviating from the desired separation performance such that the separated first fuel cannot be processed, so that the raw fuel separation performance of the separator may be maintained to the desired manner.

A fourth aspect of the present invention is characterized in that, in the first aspect of the invention, the fuel supply device further includes a temperature sensor which measures the temperature of the separator as a first temperature and the temperature of the raw fuel flowing in the raw fuel path as a second temperature, upon receiving an internal combustion engine stop command, a circulation control element which actuates the raw fuel discharge device in a case where the first or the second temperature measured by the temperature sensor is equal to or higher than a predetermined temperature, and a stopping element which stops the internal combustion engine and the raw fuel discharge device, in a case where the first or the second temperature measured by the temperature sensor is lower than a predetermined temperature.

According to the fourth aspect of the invention, when receiving the internal combustion engine stop command, in the case where the inlet temperature of the separator is equal to or higher than a sufficient temperature for separating the fuel, the internal combustion engine is not stopped immediately, the raw fuel is sent into the raw fuel path by the raw fuel discharge device, and the separation processing is pursued. Thereafter, in the case where the inlet temperature of the separator is lower than a predetermined temperature, the internal combustion engine and the raw fuel discharge device are stopped. By doing so, it becomes possible to perform fuel separation, without wasting residual heat during operation of the internal combustion engine, when stopping the internal combustion engine.

BRIEF DESCRIPTION OF THE DRAWINGS

FIG. 2 is a flowchart illustrating a procedure for negative pressure control processing;

FIG. 3A is an explanatory diagram relating to a first state of a negative pressure control system, FIG. 3B is an explanatory diagram relating to a second state of the negative pressure control system, FIG. 3C is an explanatory diagram relating to a third state of the negative pressure control system, FIG. 3D is an explanatory diagram relating to a fourth state of the negative pressure control system;

FIG. 7 is a relationship diagram of the inlet temperature and a transmission rate of the separator.

DESCRIPTION OF THE PREFERRED EMBODIMENTS (Structure)

Figure 1:
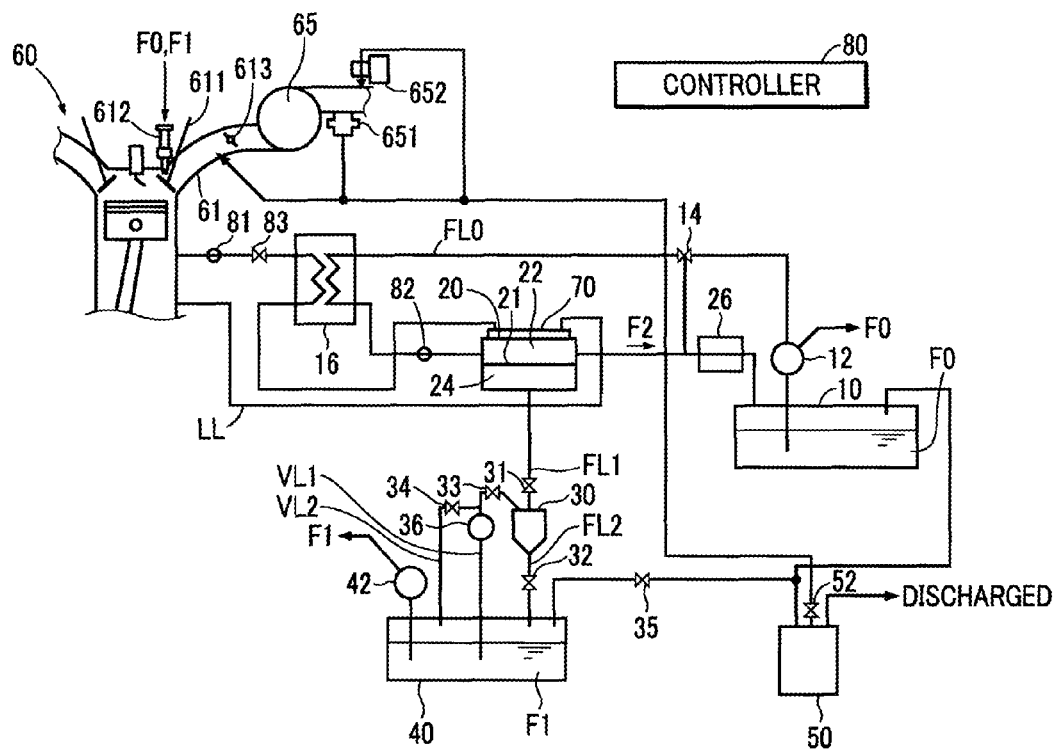
FIG. 1 is a configuration explanatory diagram illustrating a fuel supply device as one exemplary embodiment of the present invention.

The fuel supply device illustrated in FIG. 1 includes a raw fuel tank 10, a separator 20, a condenser 30, a first fuel tank 40, a canister 50, and a controller (or an electronic control unit [ECU]) 80. The fuel supply device is mounted on a vehicle and is configured to supply fuel to an internal combustion engine 60, which is also mounted on the vehicle.

The raw fuel tank 10 stores normal or commercially-available gasoline, which is supplied through a fill opening, as a raw fuel F0. The raw fuel F0 stored in the raw fuel tank 10 is increased in pressure up to a specified pressure by a high-pressure supply pump 12 (a raw fuel discharge device) and then supplied to the internal combustion engine 60 (not illustrated).

Moreover, after the increase in pressure up to the specified pressure by the high-pressure supply pump 12, the raw fuel F0 is heated by a heater 16 and then fed into the separator 20 via the raw fuel path FL0. A raw fuel temperature sensor 82 is provided to the raw fuel path FL0 between the heater 16 and the separator 20. If a three-way valve 14 shuts off the raw fuel tank 10 and the heater 16, the raw fuel F0 is returned to the raw fuel tank 10 via a radiator (cooler) 26 without passing through the separator 20. The heater 16 is composed of a heat exchanger which performs heat exchange between cooling medium in the internal combustion engine 60 and the raw fuel. The heater 16 may include an electric heater instead of or in addition to the heat exchanger.

The vaporization of the raw fuel F0 stored in the raw fuel tank 10 generates a vaporized fuel V which contains hydrocarbon and ethanol. The vaporized fuel V is supplied from the raw fuel tank 10 to the canister 50.

The separator 20 is configured to separate the raw fuel F0 into a first fuel F1 and a second fuel F2 in a pervaporation (PV) process. The separator 20 includes a separating film 21, which selectively causes high octane number components in the raw fuel (gasoline) to permeate the separating film 21, and a high-pressure chamber 22 and a low-pressure chamber 24, which are partitioned by the separating film 21.

The first fuel F1 is a high octane number fuel which contains a larger number of high octane number components than the raw fuel F0, and it is, for example, alcohol such as ethanol. The second fuel F2 is a low octane number fuel which contains a smaller number of high octane number components than the raw fuel F0.

Specifically, the high-temperature and high-pressure raw fuel F0 is supplied to the high-pressure chamber 22 of the separator 20 while the low-pressure chamber 24 is maintained in a negative pressure state, by which the high octane number components contained in the raw fuel F0 permeate the separating film 21 and leach into the low-pressure chamber 24. Increase in the high octane number component amount of the raw fuel F0 increases the octane number of the permeation fluid, thereby enabling the recovery of the first fuel F1, which contains a large number of high octane number components with the octane number higher than the raw fuel F0, from the low-pressure side of the separating film 21.

Meanwhile, the high octane number component amount contained in the raw fuel F0 which flows into the high-pressure chamber 22 decreases as the raw fuel F0 flows down the stream. Therefore, the second fuel F2, which contains a small number of high octane number components with the octane number lower than the raw fuel F0, remains in the high-pressure chamber 22. The second fuel F2 leaked out of the separator 20 is cooled down in the radiator 26 and then supplied to the raw fuel tank 10.

Moreover, the operating conditions of the separator 20 are controlled such as the temperature of the separating film 21, the temperature and supply amount of the raw fuel F0, the pressure of the high-pressure chamber 22, the pressure (negative pressure) of the low-pressure chamber 24, and the like. This changes the separation speed or recovery amount of the first fuel F1 and the second fuel F2 of the separator 20.

For example, the heater 16 controls the temperature of the raw fuel F0 supplied to the separator 20, thereby enabling the adjustment of the temperature of the separating film 21. Further, a temperature of the separating film 21 may be adjusted, by performing heat exchange with a cooling medium explained later. Moreover, the decompression of the condenser 30 by the operation of the vacuum pump 36 enables the adjustment of the pressure of the low-pressure chamber 24 communicated with the condenser 30.

In addition, the second fuel F2 may be supplied to a second fuel tank (not illustrated) different from the raw fuel tank 10 and then stored in the second fuel tank. Moreover, the second fuel F2 stored in the second fuel tank may be supplied to the internal combustion engine 60, instead of the raw fuel F0.

The condenser (negative pressure tank) 30 is provided along a recovery path connecting the low-pressure chamber 24 of the separator 20 and the first fuel tank 40 and is configured to condense the first fuel F1. The condenser 30 is composed of, for example, an air-cooled or water-cooled tank or reservoir.

The condenser 30 is connected to the vacuum pump (negative pressure pump) 36 on the suction side thereof. The operation of the vacuum pump 36 controls the inside of the condenser 30 so as to be placed in the negative pressure state, thereby enabling the pressure of the inside to be lower than the vapor pressure of the first fuel F1. The vaporized fuel V containing alcohol such as ethanol generated by the vaporization of the first fuel F1 is supplied to the canister 50 and the like. The condenser 30 is provided with a pressure sensor (not illustrated) for use in measuring the pressure of the inside of the condenser 30.

A primary recovery path FL1 connecting the separator 20 and the condenser 30 is provided with a first opening/closing mechanism 31 which opens and closes the primary recovery path FL1. The opening of the first opening/closing mechanism 31 provides communication between the low-pressure chamber 24 of the separator 20 and the condenser 30, while the closing of the first opening/closing mechanism 31 disconnects the separator 20 from the condenser 30.

A secondary recovery path FL2 connecting the condenser 30 and the first fuel tank 40 is provided with a second opening/closing mechanism 32 which opens and closes the secondary recovery path FL2. The opening of the second opening/closing mechanism 32 provides communication between the condenser 30 and the first fuel tank 40, while the closing of the second opening/closing mechanism 32 disconnects the condenser 30 from the first fuel tank 40.

The condenser 30 and the first fuel tank 40 are connected to each other by a first vaporized fuel path VL1, which is different from the secondary recovery path FL2. The first vaporized fuel path VL1 is provided with a third opening/closing mechanism 33 and a vacuum pump 36. The opening of the third opening/closing mechanism 33 and the operation of the vacuum pump 36 cause the vaporized fuel V to be introduced from the condenser 30 into the first fuel F1 stored in the first fuel tank 40.

The first vaporized fuel path VL1 is connected to the first fuel tank 40 via a second vaporized fuel path VL2, which diverges from the upstream side of the vacuum pump 36. The second vaporized fuel path VL2 is provided with a fourth opening/closing mechanism 34. The opening of the fourth opening/closing mechanism 34 with the third opening/closing mechanism 33 opened causes the vaporized fuel V filling the first fuel tank 40 to be introduced into the condenser 30 through the second vaporized fuel path VL2 and the first vaporized fuel path VL1.

The first fuel tank 40 stores the first fuel F1 separated from the raw fuel F0 by the separator 20. The first fuel F1 stored in the first fuel tank 40 is increased in pressure up to the specified pressure by a high-pressure supply pump 42 and then supplied to the internal combustion engine 60.

The vaporization of the first fuel F1 stored in the first fuel tank 40 generates a vaporized fuel V which contains alcohol such as ethanol. The first fuel tank 40 is connected to the canister 50 and a fifth opening/closing mechanism 35 is provided on the connection path. The opening of the fifth opening/closing mechanism 35 causes the vaporized fuel V to be supplied from the first fuel tank 40 to the canister 50 through the connection path.

The first fuel tank 40 is provided with a pressure sensor (not illustrated) for use in measuring the internal air pressure of the first fuel tank 40. Each of the opening/closing mechanisms 31 to 35 is composed of, for example, a solenoid valve. The operation and operation stop of the vacuum pump 36 enables the opening or closing of the first vaporized fuel path VL1, and therefore the third opening/closing mechanism 33 for opening or closing the first vaporized fuel path VL1 may be omitted.

The canister 50 has an adsorbent such as activated carbon built-in and the adsorbent adsorbs hydrocarbon in addition to alcohol contained in the vaporized fuel V derived from the raw fuel F0. Thereby, the vaporized fuel V is able to be separated into: alcohol and hydrocarbon; and nitrogen and other components.

The air containing the separated nitrogen and the like is discharged to the outside of the vehicle from the canister 50. Meanwhile, if an intake pipe 61 is placed in the negative pressure state after the internal combustion engine 60 starts running, the alcohol and hydrocarbon adsorbed to the adsorbent in the canister 50 are supplied to the intake pipe 61 on the downstream side of the throttle valve 613 and then introduced into a combustion chamber and burn. On an ejection path connected to the canister 50, there is provided a flow rate regulating valve 52 for regulating the flow rate of the vaporized fuel V in the ejection path.

The canister 50 may be configured to be heated by the condensation heat of the first fuel F1 generated in the condenser 30 so that the temperature is maintained within the temperature range in which the adsorption performance of the vaporized fuel V is able to be fully exerted. For example, the flow path of the medium may be configured so that the canister 50 is heated by a cooling medium of the condenser 30.

Along each path, there may be provided functional components which are not described and not illustrated, such as a reservoir or a heat exchanger.

The intake pipe 61 connected to a combustion chamber of the internal combustion engine 60 is provided with an intake valve 611, a fuel injection device 612, and a throttle valve 613. The opening of the intake valve 611 provides communication between the intake pipe 61 and the combustion chamber, while the closing of the intake valve 611 disconnects the intake pipe 61 from the combustion chamber. The throttle valve 613 is configured to adjust the intake air amount of the internal combustion engine 60.

The fuel injection device 612 is disposed between the intake valve 611 and the throttle valve 613 and is configured to selectively spray one of the raw fuel F0 and the first fuel F1 into each cylinder of the internal combustion engine 60. The fuel injection device 612 may be configured to spray both of the raw fuel F0 and the first fuel F1 with a specified mixing ratio simultaneously into each cylinder of the internal combustion engine 60. Alternatively, the fuel injection device 612 may be configured to spray the raw fuel F0 and the first fuel F1 separately from each other. A mixed gas of the air taken into the intake pipe 61 and the fuel sprayed from the fuel injection device 612 is introduced into the combustion chamber of each cylinder from the intake pipe 61.

In the case where a second fuel tank is provided, the fuel injection device 612 may be configured to selectively spray one of the first fuel F1 and the second fuel F2 or to spray both of the first fuel F1 and the second fuel F2 with a specified mixing ratio simultaneously into each cylinder of the internal combustion engine 60.

In the intake pipe 61, there are provided a turbocharger 65, a venturi gas mixer 651, and a purge pump 652 on the upstream side of the throttle valve 613. The vaporized fuel V is able to be supplied from the canister 50 to the intake pipe 61 via the purge pump 652 and the turbocharger 65.

The internal combustion engine 60 may be a naturally-aspirated engine, instead of the engine with the turbocharger 65. In this case, the vaporized fuel V may be supplied from the canister 50 to the intake pipe 61 on the downstream side of the throttle valve 613 via a purge control valve (not illustrated).

Further, the venturi gas mixer 651 may supply the vaporized fuel V directly from the condenser 30 to the intake pipe 61. Moreover, the vaporized fuel V may be supplied directly from the first fuel tank 40 to the intake pipe 61 of the internal combustion engine 60.

The fuel supply device is further provided with a cooling medium circulating path LL for circulating the cooling medium (for example, water) for cooling the internal combustion engine 60. The cooling medium circulating path LL is provided with a pump (not shown) for circulating the cooling medium in the cooling medium circulating path LL. The cooling medium circulating path LL is configured to perform heat exchange between the cooling medium and the raw fuel F0 flowing in the raw fuel path FL0, at the heater 16 downstream of the internal combustion engine 60. Further, the cooling medium circulating path LL is configured to perform heat exchange between the cooling medium and the separator 20, at downstream of the heater 16. The cooling medium circulating path LL may be configured so as not to pass the heater 16.

The cooling medium circulating in the cooling medium circulating path LL is heated by performing heat exchange with the internal combustion engine 60, cooled by performing heat exchange with the raw fuel F0 at the heater 16, further cooled by performing heat exchange with the separator 20, and again heated by the internal combustion engine 60. That is, the cooling medium circulating in the cooling medium circulating path LL first cools the internal combustion engine 60, heats the raw fuel F0 flowing in the FL1 at the heater 16, further heats the separator 20, and again cools the internal combustion engine 60. By heating the separator 20 with the cooling medium, the temperature of the separating film 21 and the raw fuel F0 inside the separator 20 is indirectly maintained to a suitable temperature, from the viewpoint of maintaining a separation performance of the raw fuel F0 by the separator 20 to a desired manner.

In order to perform heat exchange between the cooling medium and the separator 20, for example, a part of the cooling medium circulating path LL is configured by a water jacket 70 fixed to an outer side of the separator 20.

Figure 5:
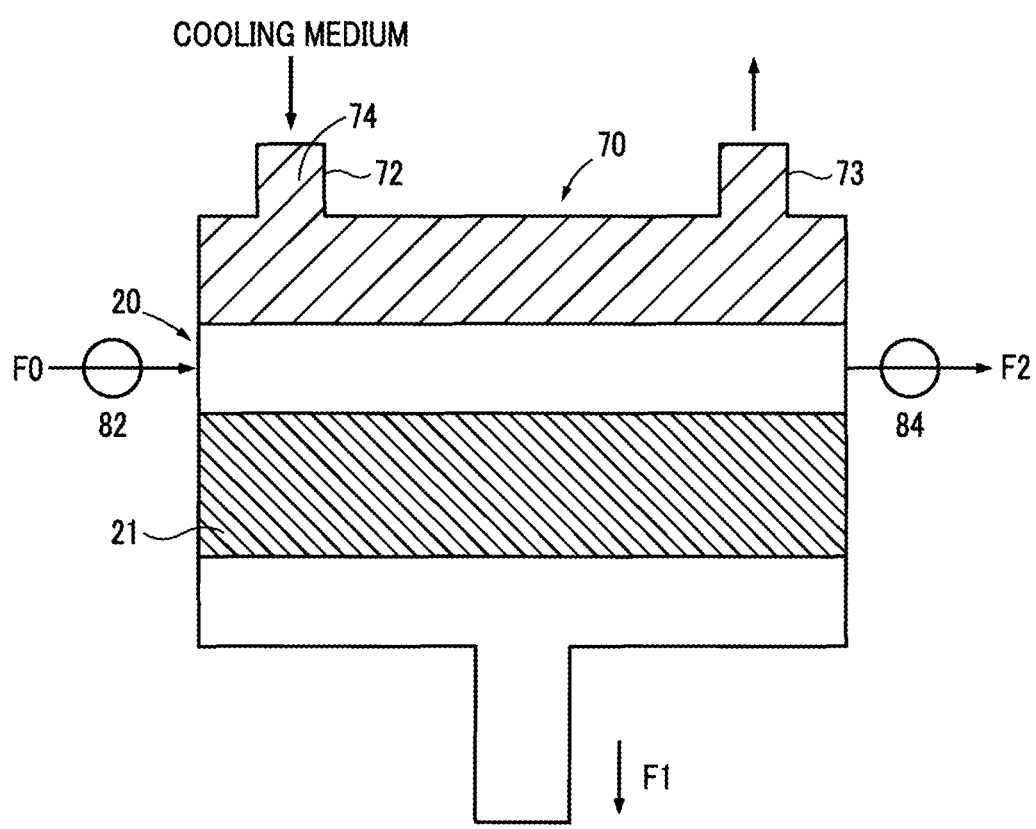
FIG. 5 is an explanatory diagram of a configuration of a water jacket and a measurement state of an inlet temperature and an outlet temperature of a separator.

With reference to FIG. 5, a configuration example of the water jacket 70 will be explained. The water jacket 70 is equipped with a water jacket inlet 72 for flowing the cooling medium into an interior 74 thereof, and a water jacket outlet 73 for flowing the cooling medium out from the interior 74 thereof.

As is shown in FIG. 1, the cooling medium circulating path LL is provided with a cooling medium temperature sensor 81 and a cooling medium opening/closing mechanism (flow rate adjusting mechanism) 83, at downstream of the internal combustion engine 60 and upstream of the heater 16. The cooling medium temperature sensor 81 and the cooling medium opening/closing mechanism 83 are not limited to upstream of the heater 16, and may be provided to downstream of the heater 16 and upstream of the separator 20. Further, the cooling medium opening/closing mechanism 83 may be arranged anywhere as long as it is at downstream of the internal combustion engine 60 and upstream of the separator 20. The cooling medium temperature sensor 81 must be arranged downstream of the internal combustion engine 60 and upstream of the cooling medium opening/closing mechanism 83, or at a place where the temperature of the cooling medium after performing heat exchange with the internal combustion engine 60 can be measured (for example, on a circulating path for circulating the cooling medium provided separately from the cooling medium circulating path LL).

As will be explained later, opening/closing of the cooling medium opening/closing mechanism 83 is adjusted on the basis of the temperature of the temperature sensors 81 and 82, by the controller 80. The cooling medium opening/closing mechanism 83 may be configured from either of a solenoid valve capable of switching between opening and interrupting the cooling medium circulating path LL or a flow control valve capable of adjusting the flow rate of the cooling medium. In the present embodiment, the cooling medium opening/closing mechanism 83 is configured from a solenoid valve.

In a case where the cooling medium opening/closing mechanism 83 is an open state, the cooling medium circulates the cooling medium circulating path LL as is explained above. In a case where the cooling medium opening/closing mechanism 83 is a closed state, the cooling medium is interrupted by the cooling medium opening/closing mechanism 83, and does not circulate the cooling medium circulating path LL.

However, even when the cooling medium opening/closing mechanism 83 is in the closed state, the cooling medium circulates a separate circulating path (not shown) configured via a separate bypass (not shown), and steadily cools the internal combustion engine 60.

The controller 80 is composed of a programmable computer. The controller 80 receives output signals from various sensors for detecting various states of the fuel supply device, such as the cooling medium temperature sensor 81 which outputs signals according to the temperature of the cooling medium, the raw fuel temperature sensor 82 which outputs signals according to the temperature of the raw fuel path FL0, and the like. The controller 80 is programmed to perform "negative pressure control processing", "cooling medium opening/closing mechanism control processing", "control processing of separation system during stopping of internal combustion engine", described later. The controller 80 is programmed to perform arithmetic processing required for the fuel injection control, the ignition timing control, and the like of the internal combustion engine 60, the adjustment of the operating condition of the separator 20, the adjustment of the fuel supplied to the internal combustion engine 60, the operation control of each pump, the opening/closing or opening degree adjustment of each valve, and the like.

The term "programmed" means that an arithmetic processing device such as a CPU which is a component of a computer reads out software in addition to required information from a memory such as a ROM or a RAM or a recording medium and then performs arithmetic processing for the information according to the software.

The controller 80 constitutes "a circulation control element" and "a stopping element" of the present invention.

(Basic Function)

The functions of the fuel supply device having the above configuration will be described below. Specifically, the controller 80 performs "negative pressure control processing" repeatedly according to a procedure described below. Hereinafter, the description assumes that the fifth opening/closing mechanism 35 is closed.

Figure 4:
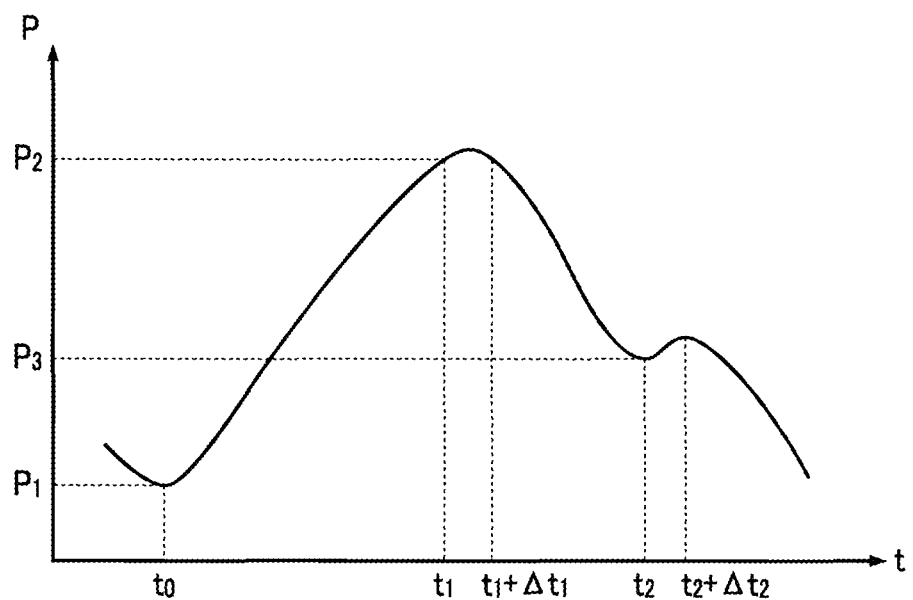
FIG. 4 is an explanatory diagram relating to a change in the internal air pressure of a condenser from the negative pressure control.

The vacuum pump 36 operates in the third state, by which the condenser 30 is decompressed and then the internal air pressure P gradually decreases (See the state before $t=t_0$ in FIG. 4). The term "third state" means a state where the primary recovery path FL1, the secondary recovery path FL2, and the second vaporized fuel path VL2 are closed and the condenser 30 is decompressed by the operation of the vacuum pump 36 (See FIG. 3C). In this state, the first vaporized fuel path VL1 is opened by the third opening/closing mechanism 33.

In this state, it is determined whether or not the internal air pressure P of the condenser 30 reaches the first negative pressure P1 or lower (STEP 002 in FIG. 2). The "negative pressure" is defined to be a negative value with the atmospheric pressure or normal pressure as a reference. Specifically, the more the pressure is lower than the atmospheric pressure, the absolute value of the negative value gets greater.

When the determination result is affirmative (YES in STEP 002 in FIG. 2 [See $t=t_0$ in FIG. 4]), the first opening/closing mechanism 31 is switched from the closed state to the open state, the third opening/closing mechanism 33 is switched from the open state to the closed state, and the operation of the vacuum pump 36 is stopped (STEP 004 in FIG. 2).

Thereby, as illustrated in FIG. 3A, there is achieved the "first state" in which the primary recovery path FL1 is open while the secondary recovery path FL2 and the second vaporized fuel path VL2 are closed and the decompression of the condenser 30 by the operation of the vacuum pump 36 is stopped.

The transition requirement from the third state to the first state may be defined according to the elapsed time from the time point at which the transition from the second or fourth state to the third state is achieved, instead of according to the internal air pressure P of the condenser 30. For example, in a condition that the elapsed time is equal to or longer than a specified time, the transition from the third state to the first state may be achieved.

In the first state, the separator 20 starts the separation into the first fuel F1 and the second fuel F2, and then the first fuel F1 is supplied from the separator 20 to the condenser 30 through the primary recovery path FL1. At least a part of the first fuel F1 is condensed (a phase transition from the vapor phase to the liquid phase) in the condenser 30 in the negative pressure and cooling state before the first fuel F1 is retained. Moreover, the vaporized fuel V increases in the condenser 30 and the internal air pressure P of the condenser 30 rises (See the state after $t=t_0$ in FIG. 4).

It is determined whether or not the internal air pressure P of the condenser 30 reaches the level equal to or higher than the second negative pressure P2, which is higher than the first negative pressure P1 (STEP 006 in FIG. 2). Since the "negative pressure" is defined as a negative value with the atmospheric pressure as a reference as described above, the absolute value of the second negative pressure P2 is smaller than the absolute value of first negative pressure P1.

When the determination result is affirmative (YES in STEP 006 in FIG. 2 [See $t=t_1$ in FIG. 4]), the first opening/closing mechanism 31 is switched from the open state to the closed state, while the second opening/closing mechanism 32 is switched from the closed state to the open state (STEP 008 in FIG. 2). Thereby, as illustrated in FIG. 3B, there is achieved the "second state" in which the primary recovery path FL1 and the second vaporized fuel path VL2 are closed while the secondary recovery path FL2 is open and the decompression of the condenser 30 by the operation of the vacuum pump 36 is stopped.

The transition requirement from the first state to the second state may be defined according to the elapsed time from the time point at which the transition from the third state to the first state is achieved, instead of according to the internal air pressure P of the condenser 30. For example, in a condition that the elapsed time is equal to or longer than a specified time, the transition from the first state to the second state may be achieved.

The respective values of the first negative pressure P1 and the second negative pressure P2 may be previously changed to various values, and the controller 80 may change the values according to the fuel supply device or the running state (acceleration requirement or the like) of the vehicle on which the fuel supply device is mounted. For example, the concentration or the content of the first fuel F1 of the raw fuel F0 stored in the raw fuel tank 10 is measured, and the second negative pressure P2 may be set to a higher level as the measured value is higher.

The first opening/closing mechanism 31 closes the primary recovery path FL1 and thus the low-pressure chamber 24 of the separator 20 is disconnected from the condenser 30, thereby causing a stop of the separation of the raw fuel F0 into the first fuel F1 and the second fuel F2 by the separator 20. The second opening/closing mechanism 32 opens the secondary recovery path FL2, by which the first fuel F1 in the liquid state retained in the condenser 30 is supplied to the first fuel tank 40 through the secondary recovery path FL2 (See the down-arrow in FIG. 3B).

After the achievement of the second state, it is determined whether or not a first specified time $\Delta t_1$ (for example, 10 [s]) elapsed (STEP 010 in FIG. 2).

When the determination result is affirmative (YES in STEP 010 in FIG. 2 [See t=$t_1$+$\Delta t_1$ in FIG. 4]), the second opening/closing mechanism 32 is switched from the open state to the closed state, while the third opening/closing mechanism 33 is switched from the closed state to the open state and the operation of the vacuum pump 36 is started (STEP 012 in FIG. 2). Thereby, the third state illustrated in FIG. 3C is achieved.

In the third state, the vaporized fuel V (gas) is supplied from the condenser 30 to the first fuel tank 40 through the first vaporized fuel path VL1 (See the down-arrow in FIG. 3C). The vaporized fuel V causes bubbling of the first fuel F1 in the first fuel tank 40, and at least a part of the vaporized fuel V in the bubbles can be brought into the first fuel F1 in the liquid state. In the first fuel tank 40, the first fuel F1 is placed in a two-phase state (vapor-liquid phase) and the supply of the vaporized fuel V from the condenser 30 causes pressure rising in the first fuel tank 40.

In addition, the vaporized fuel V may be supplied from the condenser 30 to a space filled with the vaporized fuel V similarly in the first fuel tank 40.

The operation of the vacuum pump 36 decreases the internal air pressure P of the condenser 30 (See the state after t=$t_1$+$\Delta t_1$ in FIG. 4). Here, it is determined whether or not the internal air pressure P of the condenser 30 reaches the level equal to or lower than the third negative pressure P3, which is higher than the first negative pressure P1 and lower than the second negative pressure P2 (STEP 014 in FIG. 2).

When the determination result is affirmative (YES in STEP 014 in FIG. 2 [See t=$t_2$ in FIG. 4]), the fourth opening/closing mechanism 34 is switched from the closed state to the open state (STEP 016 in FIG. 2). Thereby, as illustrated in FIG. 3D, there is achieved the "fourth state" in which the primary recovery path FL1 and the secondary recovery path FL2 are closed while the second vaporized fuel path VL2 is open and the condenser 30 is decompressed by the operation of the vacuum pump 36.

Additionally, the transition from the third state to the fourth state may be achieved in a condition that the rate of decrease |dP/dt| of the internal air pressure P is equal to or lower than a predetermined speed, instead of using the requirement that the internal air pressure P of the condenser 30 reaches the level equal to or lower than the third negative pressure P3, which is higher than the first negative pressure P1 and lower than the second negative pressure P2.

In the fourth state, the vaporized fuel V is supplied from the first fuel tank 40 to the condenser 30 through the second vaporized fuel path VL2 (See the up-arrow in FIG. 3D). Therefore, the internal air pressure P of the condenser 30 rises (See the state after t=$t_2$ in FIG. 4).

After achieving the fourth state, it is determined whether or not a second specified time $\Delta t_2$ (for example, 10 [s], which may be either the same as or different from the first specified time $\Delta t_1$) elapsed (STEP 018 in FIG. 2).

When the determination result is affirmative (YES in STEP 018 in FIG. 2 [See t=$t_2$+$\Delta t_2$ in FIG. 4]), the fourth opening/closing mechanism 34 is switched from the open state to the closed state (STEP 020 in FIG. 2). Thereby, the third state is achieved again, by which the internal air pressure P of the condenser 30 shifts from rising to falling (See the state after t=$t_2$+$\Delta t_2$ in FIG. 4).

Subsequently, the above series of processes are repeated (See STEP 002 to STEP 020 in FIG. 2).

Moreover, the controller 80 determines whether or not the open condition of the first fuel tank 40 is satisfied during execution of the negative pressure control processing. As the "open condition," it is possible to employ a condition that the measurement pressure of the first fuel tank 40 is equal to or higher than the threshold value or that there is a request to increase the speed of the vehicle exceeding the threshold value or a combination of these conditions.

When it is determined that the open condition is satisfied, the fifth opening/closing mechanism 35 is switched from the closed state to the open state and there is achieved the fifth state in which the path connecting the first fuel tank 40 to the canister 50 is open. In this process, for example, the first opening/closing mechanism 31, the second opening/closing mechanism 32, the third opening/closing mechanism 33, and the fourth opening/closing mechanism 34 are controlled to be placed in the closed state. In the fifth state, the vaporized fuel V is emitted from the first fuel tank 40 and adsorbed to the canister 50 and thereafter supplied to the internal combustion engine 60 through the intake pipe 61 as needed. The vaporized fuel V may be directly supplied to the internal combustion engine 60. This enables the improvement in usage efficiency of the vaporized fuel V.

According to "the negative pressure control processing", the first fuel F1 separated by the separator 20 is supplied to the condenser 30 in a gas phase state (in a form of the vaporized fuel), from the separator 20 via the first recovery path FL1, and is retained in a liquid phase state by at least a part thereof being condensed in the condenser 30.

Subsequently, in the second state (the primary recovery path FL1: closed, the second vaporized fuel path VL2: closed, the secondary recovery path FL2: open, the condenser 30: decompression stopped), the first fuel F1 in the liquid state is supplied from the condenser 30 to the first fuel tank 40 through the secondary recovery path FL2 (See STEP 008 in FIG. 2 and FIG. 3B).

Furthermore, in the third state (the primary recovery path FL1: closed, the secondary recovery path FL2: closed, the second vaporized fuel path VL2: closed, the condenser 30: decompressed), the vacuum pump 36 operates. Thereby, the vaporized fuel V is supplied from the condenser 30 to the first fuel tank 40 through the first vaporized fuel path VL1 (See STEP 012 in FIG. 2 and FIG. 3C).

In this process, the internal air pressure P of the condenser 30 decreases (See t=$t_1$+$\Delta t_1$ to $t_2$ in FIG. 4). At least a part of the vaporized fuel V transits in phase from the vapor phase to the liquid phase and is able to be stored as the first fuel F1 in the first fuel tank 40. In this manner, it is possible to prevent the vaporized fuel V from being discharged to the outside of the vehicle in an unrecoverable and unusable form at the time of decompression of the condenser 30, thereby enabling the improvement in the utilization rate of the vaporized fuel V.

It may be configured so that the above-mentioned "negative pressure control processing" is not adopted, and the vaporized fuel V is ejected to the outside of the vehicle.

(Additional Function)

Next, explanation will be given on "the cooling medium opening/closing mechanism control processing". Specifically, the controller 80 performs "the cooling medium opening/closing mechanism control processing" repeatedly according to a procedure described below. Hereinafter, the description assumes that the cooling medium opening/closing mechanism 83 is in the closed state at beginning of the processing. In the case where the cooling medium opening/closing mechanism 83 is in the closed state, the cooling medium does not flow into the water jacket 70, so that heat affection to the separator 20 by the cooling medium does not occur.

Figure 6:
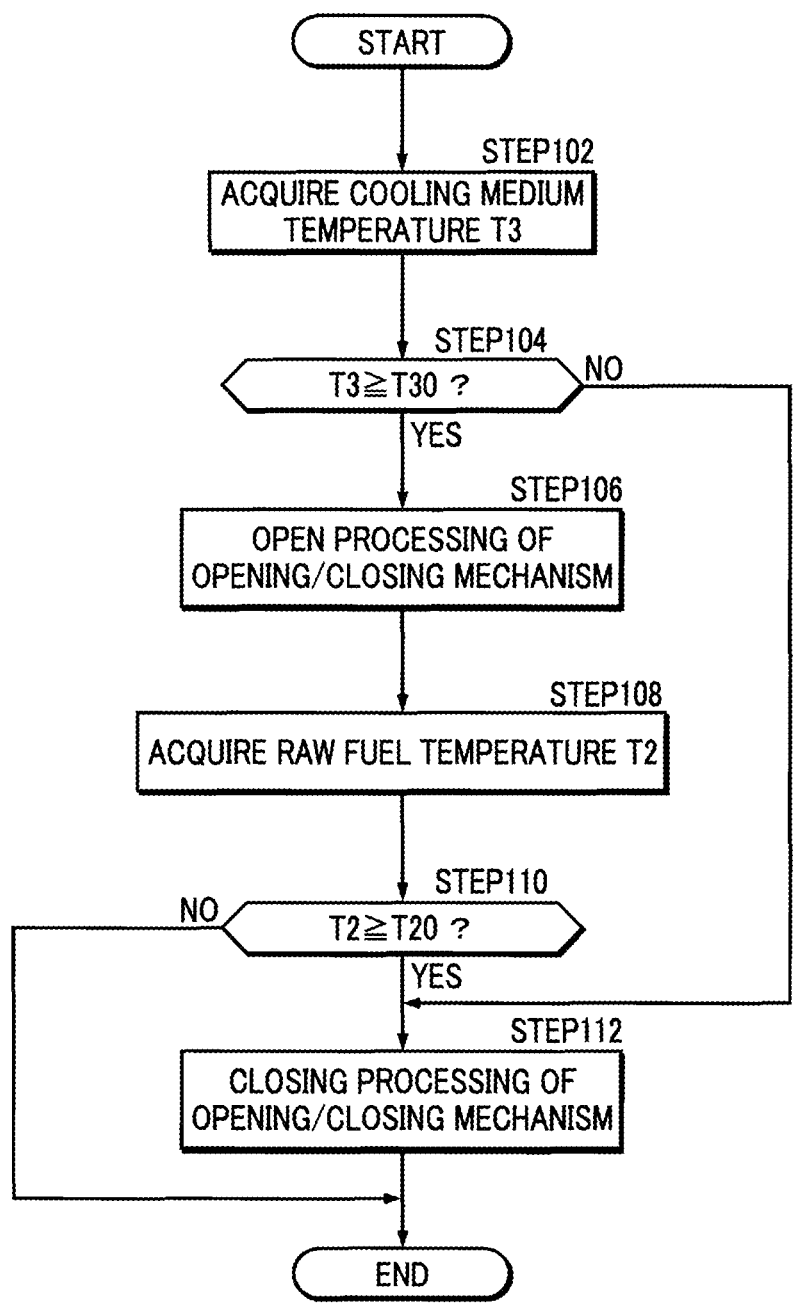
FIG. 6 is a flowchart of a cooling medium opening/closing mechanism control processing.

In "the cooling medium opening/closing mechanism control processing", first a cooling medium temperature (a third temperature) T3 is acquired from the cooling medium temperature sensor 81 (STEP 102 in FIG. 6). The cooling medium temperature T3 is low during stopping or immediately after starting of the internal combustion engine 60, and becomes higher in a state where the internal combustion engine 60 is operating for a sufficiently long period.

Next, it is determined whether or not the cooling medium temperature T3 is equal to or higher than a predetermined cooling medium reference temperature T30 (for example, 50° C.) (STEP 104 in FIG. 6). In the case where the cooling medium temperature T3 is lower than the cooling medium reference temperature T30 (NO in STEP 104 in FIG. 6), the cooling medium opening/closing mechanism 83 is controlled to the closed state (STEP 112 in FIG. 6). Thereafter, current cycle of "the cooling medium opening/closing mechanism control processing" is finished, and next cycle begins.

In the case where the cooling medium temperature T3 is equal to or higher than the cooling medium reference temperature T30 (YES in STEP 104 in FIG. 6), the cooling medium opening/closing mechanism 83 is controlled to the open state (STEP 106 in FIG. 6). By doing so, the cooling medium being interrupted by the cooling medium opening/closing mechanism 83 circulates in the cooling medium circulating path LL, and exchanges heat with the raw fuel F0 in the heater 16, and exchanges heat with the separator 20 in the water jacket 70.

After setting the cooling medium opening/closing mechanism 83 to the open state, a temperature T2 of the raw fuel F0 is acquired from the raw fuel temperature sensor 82 (STEP 108 in FIG. 6). When the raw fuel temperature (a second temperature) T2 is high, the internal temperature of the separator 20 becomes high, when the raw fuel temperature T2 is low, the internal temperature of the separator 20 becomes low.

Thereafter, it is determined whether or not the raw fuel temperature T2 is equal to or higher than a predetermined raw fuel reference temperature T20 (for example, 75° C.) (STEP 110 in FIG. 6). If, in the case where the raw fuel temperature T2 is lower than the raw fuel reference temperature T20 (NO in STEP 110 in FIG. 6), the current cycle of "the cooling medium opening/closing mechanism control processing" is finished, and the next cycle begins.

In the case where the raw fuel temperature T2 is equal to or higher than the raw fuel reference temperature T20 (YES in STEP 110 in FIG. 6), the cooling medium opening/closing mechanism 83 is controlled to the closed state (STEP 112 in FIG. 6). Thereafter, the current cycle of "the cooling medium opening/closing mechanism control processing" is finished, and the next cycle begins.

Next, "control processing of separation system during stopping of internal combustion engine" will be explained. The present control is performed to the internal combustion engine 60 and the fuel supply device by the controller 80, when the controller 80 receives a stop command signal of the internal combustion engine 60 (internal combustion engine stop command). The stop command signal of the internal combustion engine 60 is, for example, output from an ignition switch for the internal combustion engine 60 (not shown), when the switch is switched from ON to OFF.

Figure 8:
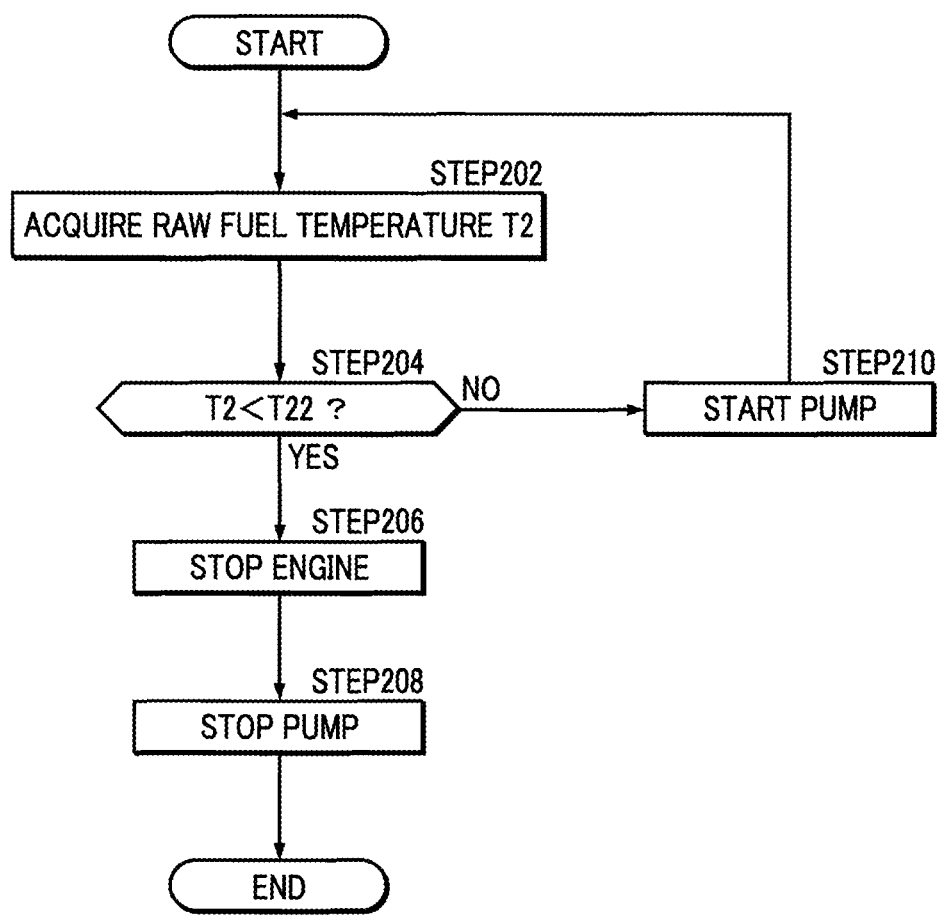
FIG. 8 is a flowchart of a control processing of a separation system during stopping of an internal combustion engine.

First, the raw fuel temperature T2 of the raw fuel F0 at the raw fuel path FL0 is acquired (FIG. 8/STEP 202). Next, it is determined whether or not the raw fuel temperature T2 is lower than a predetermined raw fuel reference temperature T22 (FIG. 8/STEP 204). In the case where the raw fuel temperature T2 is equal to or higher than the raw fuel reference temperature T22 (FIG. 8/STEP 204 . . . NO), the separation processing is started by operating the high-pressure supply pump 12 (FIG. 8/STEP 21), and returns to the processing of STEP 202.

In the case where the raw fuel temperature T2 is lower than the raw fuel reference temperature T22 (FIG. 8/STEP 204 . . . YES), the internal combustion engine 60 is stopped (FIG. 8/STEP 206), and, the operation of the fuel supply device is stopped (FIG. 8/STEP 208).

In "the control processing of separation system during stopping of internal combustion engine", it may be determined, in place of the raw fuel temperature T2, whether or not the temperature T1 of the separator 20 is smaller than a predetermined separator reference temperature T12.

The raw fuel reference temperature T22 is a temperature set from the viewpoint of performing fuel separation without wasting residual heat during operation of the internal combustion engine 60, and may be the same with or different from the raw fuel reference temperature T20. Also, the separator reference temperature T12 is a temperature set from the viewpoint similar to that of the raw fuel reference temperature T22, and may be the same with or different from the separator reference temperature T10.

(Effect)

According to "the cooling medium opening/closing mechanism control processing" of the present embodiment, in the case where the cooling medium temperature T3 is equal to or higher than the cooling medium reference temperature T30 and the raw fuel temperature T2 is equal to or lower than the raw fuel reference temperature T20, the cooling medium circulates in the cooling medium circulating path LL. The cooling medium circulating in the cooling medium circulating path LL heats the separator 20 at the water jacket 70. By heating the separator 20, heat quantity lost by evaporative latent heat and radiation is compensated, and the separating film 21 and the fuel in the separator 20 may be maintained to a suitable temperature. As is shown in FIG. 7, the temperature T1 of the separator 20 exerts strong influence on a transmission rate (separation performance) together with the raw fuel temperature T2. Therefore, by controlling the temperature of the separator 20 to a suitable temperature, the transmission rate of the fuel F1 may be controlled to a desired range.

When the raw fuel temperature T2 near the inlet of the separator 20 (measured by the raw fuel temperature sensor 82 shown in FIG. 5) is 75° C., in the case where there is no heating of the separator 20 by the cooling medium, the fuel temperature drops from the evaporative latent heat and radiation and the like, so that the raw fuel temperature near the outlet of the separator 20 (measured by the second fuel temperature sensor 84 in FIG. 5) becomes around 74° C. In the case where there is heating of the separator 20 by the cooling medium, the heat quantity equivalent to the temperature drop may be supplemented by the heat quantity from the cooling medium, so that the temperature near the outlet may be maintained to around 75° C. According to experiments conducted by the present inventors, in the case where there is heating of the separator 20 by the cooling medium, the transmission rate of the first fuel F1 may be made 1.2 times faster compared to the case where there is no heating of the separator 20 by the cooling medium.

In the situation where the temperature of the cooling medium is low, such as immediately after starting of the internal combustion engine, when the cooling medium enters the water jacket 70, the separator 20 will be cooled, so that the rise in temperature of the temperature T1 of the separating film 21 is inhibited. Therefore, in the present embodiment, the temperature of the cooling medium is being monitored, and in the case where the temperature thereof is equal to or lower than the predetermined temperature, the cooling medium opening/closing mechanism 83 is maintained in the closed state, so as to interrupt the circulating of the cooling medium and prevent generation of the heat influence of the cooling medium to the separator.

On the other hand, in the case where the separator 20 is excessively heated by the cooling medium, the transmission rate increases excessively, and as a result, the condenser 30 having small volume cannot condense all of the fuel F1 sent from the separator 20. In order to avoid such situation, in the present embodiment, the raw fuel temperature sensor 82 is provided near the inlet of the separator 20, and the raw fuel temperature T2 near the inlet of the separator 20 is being monitored. In the case where the raw fuel temperature T2 near the inlet of the separator 20 becomes too high, the cooling medium opening/closing mechanism 83 is set to the closed state, so as to interrupt the circulation of the cooling medium, and prevent generation of heat influence of the cooling medium to the separator 20.

According to the present embodiment, as is explained above, the temperature of the separator 20 may be retained to a temperature range appropriate from the viewpoint of maintaining the separation performance of the separator 20 to a desired manner, so that the separation performance of the separator 20 may be maintained to a desired manner.

Further, the separated second fuel F2 is cooled by performing heat exchange with the radiator 26, and thereafter returned to the raw fuel tank 10, so that it becomes possible to prevent the temperature rise of the raw fuel F0 inside the raw fuel tank 10. By doing so, it becomes possible to avoid excessive heating of the separator 20, by the raw fuel F0 supplied to the separator 20, and to maintain the separation performance of the separator 20 to a desired range.

Further, according to "the control processing of the separation system during stopping of the internal combustion engine" of the present embodiment, in the case where the raw fuel temperature T2 is equal to or higher than a temperature sufficient for separating the fuel, the internal combustion engine 60 is not stopped immediately, the raw fuel F0 is sent to the raw fuel path FL0 by the high-pressure supply pump 12, and the separation processing is continued. And, in the case where the raw fuel temperature T2 is lower than the predetermined temperature, the internal combustion engine 60 and the high-pressure supply pump 12 is stopped. By doing so, upon stopping the internal combustion engine 60, the fuel separation may be performed without wasting the residual heat during operation of the internal combustion engine 60.

Other Embodiments of the Present Invention

In the present embodiment, the cooling medium opening/closing mechanism 83 is set to the open state when the cooling medium temperature T3 is equal to or higher than the cooling medium reference temperature T30, and the cooling medium opening/closing mechanism 83 is set to the closed state in the case where the raw fuel temperature T2 is equal to or higher than the raw fuel reference temperature T20. However, for example, the cooling medium opening/closing mechanism 83 may be set to the closed state, in the case where the temperature T1 of the separator 20 (the first temperature) is equal to or higher than the predetermined separator reference temperature T10 (for example, 75° C.), or the cooling medium temperature T3 is equal to or larger than a predetermined temperature equal to or higher than the separator reference temperature T10 (for example, 80° C.), instead of the raw fuel temperature T2.

Alternatively, the cooling medium opening/closing mechanism 83 may be set to the closed state, in the case where all of the temperature T1 of the separator 20, the raw fuel temperature T2, and the cooling medium temperature T3 are equal to or higher than a predetermined temperature (for example, 75° C.) equal or higher than the separator reference temperature T10. Further, the cooling medium opening/closing mechanism 83 may be set to the open state, in the case where the temperature T1 of the separator 20 or the raw fuel temperature T2 is equal to or higher than a predetermined temperature (for example, 50° C.) equal to or higher than the cooling medium reference temperature T30, instead of the cooling medium temperature T3. Moreover, the cooling medium opening/closing mechanism 83 maybe opened/closed, on the basis of whether or not the cooling medium temperature T3 is equal to or higher than the cooling medium reference temperature T30, without using the raw fuel temperature T2. On the other hand, the cooling medium opening/closing mechanism 83 may be opened/closed, on the basis of whether or not the raw fuel temperature T2 is equal to or higher than the raw fuel reference temperature T20, without using the cooling medium temperature T3.

Further, not only setting the cooling medium opening/closing mechanism 83 to the open state or the closed state, on the basis of whether or not the measured temperature among the first temperature T1 through the third temperature T3 is equal to or higher than the predetermined temperature, but in the case where the cooling medium opening/closing mechanism 83 is configured from a flow regulating valve capable of controlling the flow rate, an opening of the cooling medium opening/closing mechanism 83 may be adjusted continuously or intermittently according to the measured temperature, so that the temperature T1 of the separator is within an appropriate temperature range from the viewpoint of maintaining the separation performance of the separator to a desired range.

For example, in the case where the measured temperature is within the appropriate temperature range from the viewpoint of maintaining the separation performance of the separator 20 to a desired range but it is close to an upper limit value of the temperature range, the opening of the cooling medium opening/closing mechanism 83 may be adjusted continuously or intermittently so as to reduce the flow rate.

Further, a circulating pattern of the cooling medium circulating path may be controlled, for example by a feed-forward control, without measuring any of the separator temperature T1, the raw fuel temperature T2, and the cooling medium temperature T3.

What is claimed is:

1. A fuel supply device which supplies an internal combustion engine with a first fuel which contains a larger number of high octane number components than a raw fuel, and the raw fuel or a second fuel which contains a larger number of low octane number components than the raw fuel selectively or with a specified mixing ratio simultaneously, where the first fuel and the second fuel are separated from the raw fuel, the device comprising:
    a raw fuel tank storing the raw fuel;
    a separator which separates the raw fuel into the first fuel and the second fuel;
    a raw fuel path configured to discharge the raw fuel from the raw fuel tank to the separator by a raw fuel discharge device;
    a cooling medium circulating path configured to circulate a cooling medium for cooling the internal combustion engine;
    a second fuel path configured to feed the second fuel separated by the separator into the raw fuel tank; and
    a cooler configured to cool the second fuel, in the second fuel path, wherein the cooling medium circulating path is configured to perform heat exchange between the cooling medium circulating in the cooling medium circulating path and the separator, and the fuel supply device further comprises a flow rate adjusting mechanism which adjusts a flow rate of the cooling medium in the cooling medium circulating path, taking at least one of a first temperature which is a temperature of the separator, a second temperature which is a temperature of the raw fuel in the raw fuel path, and a third temperature which is a temperature of the cooling medium downstream of the internal combustion engine and upstream of the separator flowing in the cooling medium circulating path, as a reference factor, so that the first temperature is contained in a predetermined temperature range.

2. The fuel supply device according to claim 1, further comprising:
a heat exchanger configured to perform heat exchange between the cooling medium flowing in the cooling medium circulating path downstream of the internal combustion engine and upstream of the separator and the raw fuel flowing in the raw fuel path.

3. A fuel supply device which supplies an internal combustion engine with a first fuel which contains a larger number of high octane number components than a raw fuel, and the raw fuel or a second fuel which contains a larger number of low octane number components than the raw fuel selectively or with a specified mixing ratio simultaneously, where the first fuel and the second fuel are separated from the raw fuel, the device comprising:
a raw fuel tank storing the raw fuel;
a separator which separates the raw fuel into the first fuel and the second fuel;
a raw fuel path configured to discharge the raw fuel from the raw fuel tank to the separator by a raw fuel discharge device;
a cooling medium circulating path configured to circulate a cooling medium for cooling the internal combustion engine;
a temperature sensor which measures the temperature of the separator as a first temperature and the temperature of the raw fuel flowing in the raw fuel path as a second temperature, upon receiving an internal combustion engine stop command;
a circulation control element which actuates the raw fuel discharge device in a case where the first or the second temperature measured by the temperature sensor is equal to or higher than a predetermined temperature; and
a stopping element which stops the internal combustion engine and the raw fuel discharge device, in a case where the first or the second temperature measured by the temperature sensor is lower than a predetermined temperature, wherein
the cooling medium circulating path is configured to perform heat exchange between the cooling medium circulating in the cooling medium circulating path and the separator, and
the fuel supply device further comprises a flow rate adjusting mechanism which adjusts a flow rate of the cooling medium in the cooling medium circulating path, taking at least one of a first temperature which is a temperature of the separator, a second temperature which is a temperature of the raw fuel in the raw fuel path, and a third temperature which is a temperature of the cooling medium downstream of the internal combustion engine and upstream of the separator flowing in the cooling medium circulating path, as a reference factor, so that the first temperature is contained in a predetermined temperature range.

4. The fuel supply device according to claim 3, further comprising:
a heat exchanger configured to perform heat exchange between the cooling medium flowing in the cooling medium circulating path downstream of the internal combustion engine and upstream of the separator and the raw fuel flowing in the raw fuel path.

* * * * *